June 30, 1942.    W. E. MARTIN    2,288,291
METHOD OF FORMING CUTTERS
Filed April 23, 1941
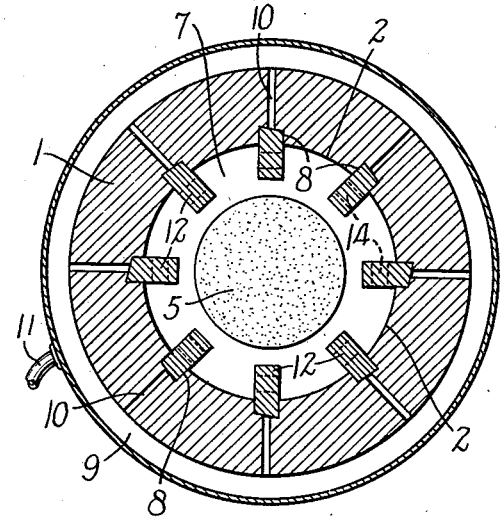
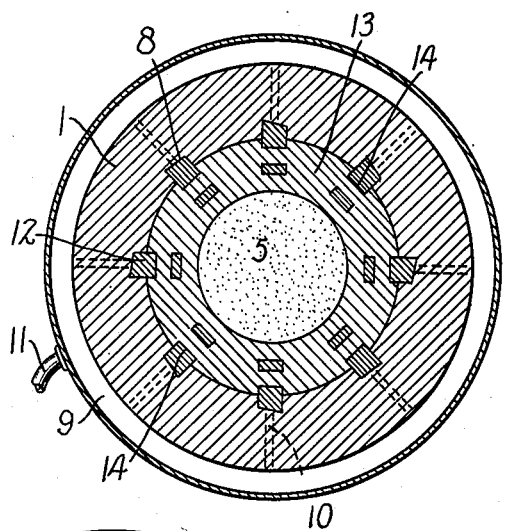
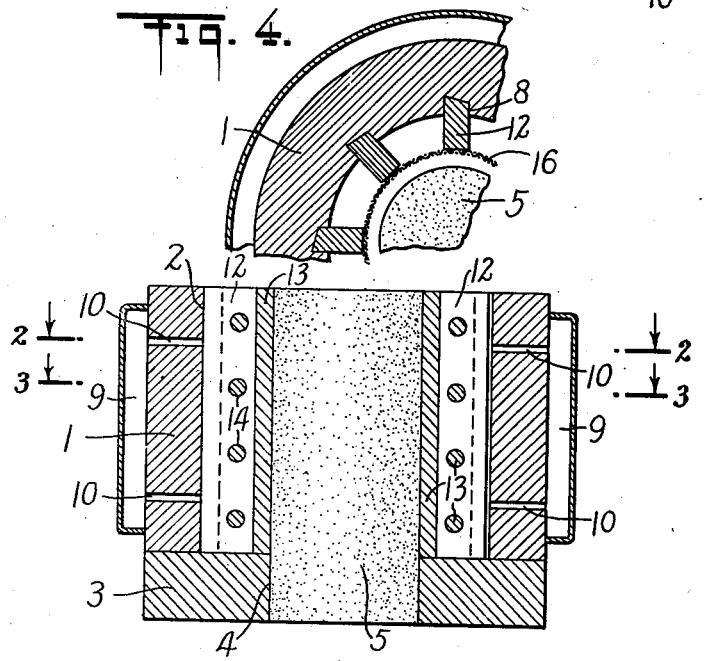
INVENTOR
Wayne E. Martin
BY
Blair, Curtis & Hayward
ATTORNEYS Patented June 30, 1942

2,288,291

UNITED STATES PATENT OFFICE 2,288,291

METHOD OF FORMING CUTTERS

Wayne E. Martin, Bayside, N. Y.

Application April 23, 1941, Serial No. 389,858

3 Claims. (Cl. 22—116)

This invention relates to a milling cutter and to the method of making the same.

One object of the invention resides in the provision of a method of producing a milling cutter in which the hardened and drawn high speed steel cutting blades are cast in the base of the cutter simultaneously with the formation of the base.

Another object of the invention resides in the provision of a milling cutter in which the base and blades are permanently held together and in which the base is of a different metal than that of the blades.

A further object of the invention is to simplify the production of milling cutters with the result that they may be more speedily produced than has been possible in the past.

Other objects and advantages of the invention will appear as the description of the particular embodiment that is chosen for illustrative purposes proceeds.

In the drawing:

Figure 1 is a vertical section disclosing the device used in casting and also the cutter blades and base of the milling cutter;

Figure 2 is a section on line 2—2 of Figure 1;

Figure 3 is a section on line 3—3 of Figure 1; and

Figure 4 is a fragmentary horizontal sectional view of a modification.

Referring now to the form of the invention illustrated by Figures 1, 2 and 3 and describing the method of producing the milling cutter illustrated in these figures, a metal die 1 with its central opening 2 therein is mounted on a metal base 3 which has a central opening 4 of smaller horizontal dimension than the opening 2 of the die but coaxial with the opening 2. A core 5 which extends into the central opening 4 in the metal base 3 at 6 is located within the opening 2 of the cylinder 1. This core may be formed of any of the well known materials used for similar purposes. The horizontal dimensions of the core being less than that of the opening 2 of the die 1, a space 7 is located between the core and the inner face of the die 1.

The outer surface of the die 1 may be of any desired form, but for convenience I have shown it cylindrical.

Likewise the inner surface of the die may be of any desired form, but here again I have shown it cylindrical for convenience.

Likewise the outer surface of the core may be of any desired form, but for the sake of convenience I have shown this also cylindrical.

The inner surface of the die 1 is provided with spaced slots 8 which extend lengthwise of the die and are so formed as to accommodate the outer portions of the cutter blades with a snug fit.

A chamber 9 surrounds the die 1 and orifices 10 extend from this chamber to the slots 8 as illustrated in Figures 1, 2 and 3 of the drawing.

A vacuum pump (not shown) of any of the conventional forms has communication with the chamber 9 by means of a conduit 11. While it is desirable to have the orifices 10 all communicate with one chamber, they may, of course, communicate with several chambers or even directly with the evacuating pump.

Using the device which I have above described, the method of forming the milling cutter consists essentially of placing the cutter blades 12 which are preferably of hardened and drawn high speed steel ground somewhat to above size in the slots 8 in the inner surface of the die 1. The vacuum pump connected to the chamber 9 by the conduit 11 is then set in operation and tends to evacuate the air from the chamber 9. In so doing it creates a suction through the orifices 10 and by this suction the plates 12 are held in their proper positions in the slots 8 in the die 1.

The metal 13 of the base of the milling cutter is then poured into the space 7 between the inner surface of the die 1 and the outer surface of the core 5.

I form openings 14 in the cutter blades and may, if desired, serrate or groove the surfaces of the blades. When the metal for the base or cutter 13 is poured it will flow through or into the openings 14 and form slots which will lock the cutter blades in the recesses of the case base of the milling cutter.

Upon cooling the metal of the base 13 will of course take on the form of the inner surface of the die 1, and the outer surface of the core 5, and as most metals become smaller in diameter upon cooling this tendency of the case metal will cause it to shrink firmly on to the cutting blades, and because of the presence of the metal in the openings 14 or in the serrations or slots above referred to, the shrinking of the cast metal on to the cutting blades will be enhanced so that the blades in fact will be drawn tightly into and seated in the openings in the outer face of the base castings with the faces of the openings tightly contacting with and gripping the contiguous faces of the cutter blades.

The metal used for the base of the cutter should be one of the well known metals which does not tear during freezing, and it should have sufficient strength and endurance to withstand the repeated stresses that occur during the operation of the milling cutter. It should also have a low enough pouring temperature so that the cutting edge of the cutter blades would not become heated to a temperature which will draw their temper say to more than approximately 1100° F.

While many metals may be used for the base of the cutter, some of the aluminum alloys are admirably adapted. For instance the aluminum alloy of the Aluminum Corporation of America, known as #356 which includes 7% silicon and 0.3% magnesium as well as the aluminum making up the 100% would be satisfactory. This alloy may be heat treated at a temperature of 1000° F. to 1020° F. in a cyanide bath so that if this is used I contemplate so treating the base of the cutter and the cutter blades after the blades have been cast into the base. The result of this will be an improvement of the high speed steel of the blades, due to a nitrided skin forming on the edges of the cutter blades. Indeed a stronger alloy may be used, such as #220 of the Aluminum Corporation of America. This consists of 10% magnesium and 90% aluminum.

I also contemplate the use of copper alloys which would be required to be cooled much more rapidly than the aluminum alloys to avoid overheating of the tool steel in the blades, which might be accomplished by casting them in a chill die.

Regardless of the metal that is used for the base of the cutter, the temperature coefficient of expansion should be near that of the high speed metal used for the cutter blades.

While I have for illustrative purposes mentioned certain alloys that may be used for the base of the cutter, it is to be realized that other alloys will be suitable provided they substantially satisfy the requirements which I have above outlined.

In the modification of the method that I have illustrated in Figure 4, the use of the suction to hold the cutting blades in position in the die is dispensed with, and I use instead a wire mesh chaplet 16 which is located between the core 5 and the inner surface of the die 1, and forcibly abuts against the cutter blades to force them into the slots 8 in the inner surface of the die.

The milling cutter resulting from the practice of this method or its modification consists of a base of the desired form of a material preferably metal different from that of the high speed steel of the cutter blades, and in which the base is shrunk on to the cutter blades and may in one form be interlocked therewith by integral parts of the base, such, for instance, as the rods that extend through the openings 14 in the blades or the portions that interlock with the serrations or grooves in the faces of the blades.

I may electroplate the cutter blades with cadmium, silver, or chromium before the casting operation. When the casting takes place there will occur an alloying action between the molten metal of the casting and the cutter blade, with the result that the life of the tool will be increased.

It is apparent that by casting the base of the cutter and simultaneously emplacing the cutter blades therein the old method of machining the entire milling cutter will be obviated with the consequent saving of time and expense.

While I have illustrated and described a particular form of my invention, it is to be realized that many modifications may be made and the steps of the method may be somewhat changed and rearranged without departing from the spirit of the invention or exceeding the scope of the claims.

What I claim is:

1. The method of forming a cutter consisting of a metallic base and tool steel cutter blades in a mold including a die and a spaced core, which consists in holding the blades in the die by means of a suction, in their ultimate relation to each other and with their base portions extending into the space between the die and the core, pouring a molten base metal into said space to embrace said blades and allowing the said base to cool.

2. The method of forming a cutter consisting of a metallic base and a cutter blade, in a mold including a die and a spaced core, which consists of forming a hole through said cutter blade adjacent its base, placing said blade in a recess in said die with its base extending into said space, between the die and core, holding said blade in such position by means of a suction, and casting a metallic base in said space so as to embrace said blade and extend through said hole.

3. A mold for casting preformed cutter blades in a metallic base and for holding the blades in position during the casting operation, including, a die, a base for said die, a core spaced from the die, said core being spaced from said die, said die having blade receiving recesses opening into the space between the die and the core, adapted to receive the cutter blades, a vacuum chamber surrounding said die and having ducts extending to and communicating with said recesses whereby when an evacuating pump is connected to said chamber a suction will be produced in said ducts to hold the blades in position in the receiving recesses.

WAYNE E. MARTIN.